United States Patent
Chang et al.

(10) Patent No.: US 7,339,640 B2
(45) Date of Patent: Mar. 4, 2008

(54) TRANSFLECTIVE LIQUID CRYSTAL DISPLAY DEVICE AND FABRICATION METHOD THEREOF

(75) Inventors: Wei-Chih Chang, Miaoli Hsien (TW); Li-Sen Chuang, Penghu Hsien (TW)

(73) Assignee: TPO Display Corp., Miao-Li County (TW)

( * ) Notice: Subject to any disclaimer, the term of this patent is extended or adjusted under 35 U.S.C. 154(b) by 432 days.

(21) Appl. No.: 11/034,712

(22) Filed: Jan. 14, 2005

(65) Prior Publication Data

US 2005/0237454 A1  Oct. 27, 2005

(51) Int. Cl.
*G02F 1/1335* (2006.01)
*G02F 1/1343* (2006.01)

(52) U.S. Cl. .......... 349/114; 349/113; 349/139

(58) Field of Classification Search ........ 349/114, 349/113, 139
See application file for complete search history.

(56) References Cited

U.S. PATENT DOCUMENTS

| | | | |
|---|---|---|---|
| 6,208,395 B1 * | 3/2001 | Kanoh et al. | 349/113 |
| 6,412,969 B1 * | 7/2002 | Torihara et al. | 362/609 |
| 6,417,899 B1 * | 7/2002 | Jones et al. | 349/96 |
| 7,048,428 B2 * | 5/2006 | Tahara et al. | 362/626 |
| 2002/0041351 A1 * | 4/2002 | Baek | 349/114 |
| 2004/0085496 A1 * | 5/2004 | Paukshto et al. | 349/106 |
| 2005/0057712 A1 * | 3/2005 | Katagami et al. | 349/114 |
| 2007/0064193 A1 * | 3/2007 | Kurasawa | 349/155 |

FOREIGN PATENT DOCUMENTS

| | | |
|---|---|---|
| JP | 2002333621 | 11/2002 |
| JP | 2003131227 | 5/2003 |
| JP | 2003302628 | 10/2003 |
| JP | 2004287324 | 10/2004 |

* cited by examiner

Primary Examiner—Mike Qi
(74) Attorney, Agent, or Firm—MH2 Technology Law Group LLP

(57) ABSTRACT

A transflective liquid crystal display device having one or more substrates is provided. A light emitting device is disposed at an edge of one of the substrates, such as the lower substrate. An insulating layer is disposed on the lower substrate and is formed with a plurality of notches. Each notch has a first angled sidewall and a second angled sidewall. The second angled sidewall has an included angle from horizontal. A first reflective layer may also be provided on top of the insulating layer and extend onto the second angled sidewall. The first reflective layer on the second angled sidewall faces the light emitting device and may assist in reflecting light from the light emitting device.

18 Claims, 9 Drawing Sheets

TRANSFLECTIVE LIQUID CRYSTAL DISPLAY DEVICE AND FABRICATION METHOD THEREOF

BACKGROUND

The present invention relates to a display device, and more particularly, to a transflective liquid crystal display device.

Liquid crystal display (LCD) devices are widely used in electronic devices such as portable computers, PDAs and cell phones. LCD devices can be classified into transmissive and reflective types. A transmissive LCD utilizes a backlight as light source, while a reflective LCD utilizes ambient light. Since a transmissive LCD uses a backlight, it can appear brighter and can be used in environments with low ambient light. However, the backlight for a transmissive LCD consumes power and makes the device larger. In contrast, a reflective LCD relies on ambient light, and thus, it has the advantage of lower power consumption. Unfortunately, a reflective LCD device is difficult to shoe image in environments with low ambient light.

In order to overcome the drawbacks of these two types of LCDs, transflective LCDs have been developed. A transflective LCD is capable of displaying images in both transmissive and reflective modes. In bright ambient light, the backlight of a transflective LCD can be deactivated, thus lowering its power consumption. When less ambient light is available, the backlight of the transflective LCD is activated, thus improving its image quality over that of the reflective LCD.

FIG. 1 shows an exploded perspective view of a conventional transflective LCD device comprising an upper substrate 10 and a lower substrate 20. A liquid crystal layer 50 is interposed between upper substrate 10 and lower substrate 20. Upper substrate 10 is a color filter substrate. Lower substrate 20 is an array substrate.

In upper substrate 10 on the surface opposing lower substrate 20, a black matrix 12 and a color filter layer 14 including a plurality of red (R), green (G), and blue (B) color filters are formed. Black matrix 12 surrounds each color filter in an array matrix. A common electrode 16 is then formed to cover color filter layer 14 and black matrix 12.

In lower substrate 20 on the surface opposing upper substrate 10, a thin film transistor (TFT) serves as a switching device and is formed in an array matrix corresponding to color filter layer 14. In addition, a plurality of crossing gate lines 26 and data lines 28 are positioned such that each TFT is located near each cross point of the gate and data lines 26 and 28. In addition, a plurality of pixel regions (P) are defined by the gate and data lines 26 and 28. Each pixel region P has a pixel electrode 22 comprising a transparent portion 22a and an opaque portion 22b. Transparent portion 22a comprises a transparent conductive material, such as Indium Tin Oxide (ITO) or Indium Zinc Oxide (IZO). Opaque portion 22b comprises a metal having superior reflectivity, such as Al (aluminum).

FIG. 2 shows a sectional view of a conventional transflective LCD device comprising a lower substrate 200 and an upper substrate 260. A liquid crystal layer 230 is interposed between lower substrate 200 and upper substrate 260.

Lower substrate 200 has an insulating layer 210 and a pixel electrode 220 formed thereon. Pixel electrode 220 has an opaque portion 222 and a transparent portion 224. Opaque portion 222 can be an aluminum layer, and transparent portion 224 can be an ITO layer. Opaque portion 222 reflects ambient light 270, while transparent portion 224 passes light 280 from a backlight device 290 at the rear of lower substrate 200. On the exterior of lower substrate 200, a lower compensation film 291 and a lower polarizer 292 are also formed.

Backlight device 290 is arranged below lower polarizer 292. Backlight 290 typically comprises numerous fluorescent tubes arranged parallel to a light guide plane, with a back reflector enhancing brightness, and a diffuser layer on the light guide plane providing more uniform illumination to the liquid crystal device. For example, in portable displays, small diameter cold cathode fluorescent tubes are situated at one end or opposing ends of a light guide panel which directs light toward the LCD panel. Conventional backlight modules with fluorescent lamp sources are, however, thicker and limit scaling.

Upper substrate 260 has a common electrode 240 and a color filter 250 formed thereon. Color filter 250 includes red (R), green (G), and blue (B) regions. On the exterior of upper substrate 260, an upper compensation film 293 and an upper polarizer 294 are formed.

As noted, liquid crystal layer 230 is interposed between lower substrate 200 and upper substrate 260. The transflective LCD device is thus capable of operating in both reflective and transmissive modes. For example, during transmissive operation, light 280 is generated from backlight 290 penetrates transmissive portion 224 and passes through color filter 250. Ambient light 270 can also be reflected by reflective portion 222 and passes through color filter 250 again.

Unfortunately, a conventional transflective LCD still requires a backlight device or the like below the LCD panel, which increases its volume, weight and fabrication costs. Additionally, in conventional LCD devices, polarizers are fixed to the outside surfaces of the LCD panel. Gaps may thus exist between the polarizers and the LCD panel, allowing light leakage, and decreasing light utilization efficiency of the LCD device.

SUMMARY

Embodiments of the invention provide a transflective LCD device. The LCD device comprises a first substrate and a second substrate. A liquid crystal layer is interposed between the first substrate and the second substrate. A light emitting device is disposed at an edge of the first substrate. An insulating layer is provided over the first substrate and comprises a plurality of notches. Each notch comprises a first angled sidewall and a second angled sidewall having an included angle from horizontal. A reflective layer is provided over the insulating layer and extends onto the second angled sidewall. The reflective layer on the second angled sidewall faces the light emitting device.

DESCRIPTION OF THE DRAWINGS

The invention will become more fully understood from the detailed description given in the following and the accompanying drawings, given by way of illustration only and thus not intended to be limitative, and wherein.

DETAILED DESCRIPTION

Figure 1:
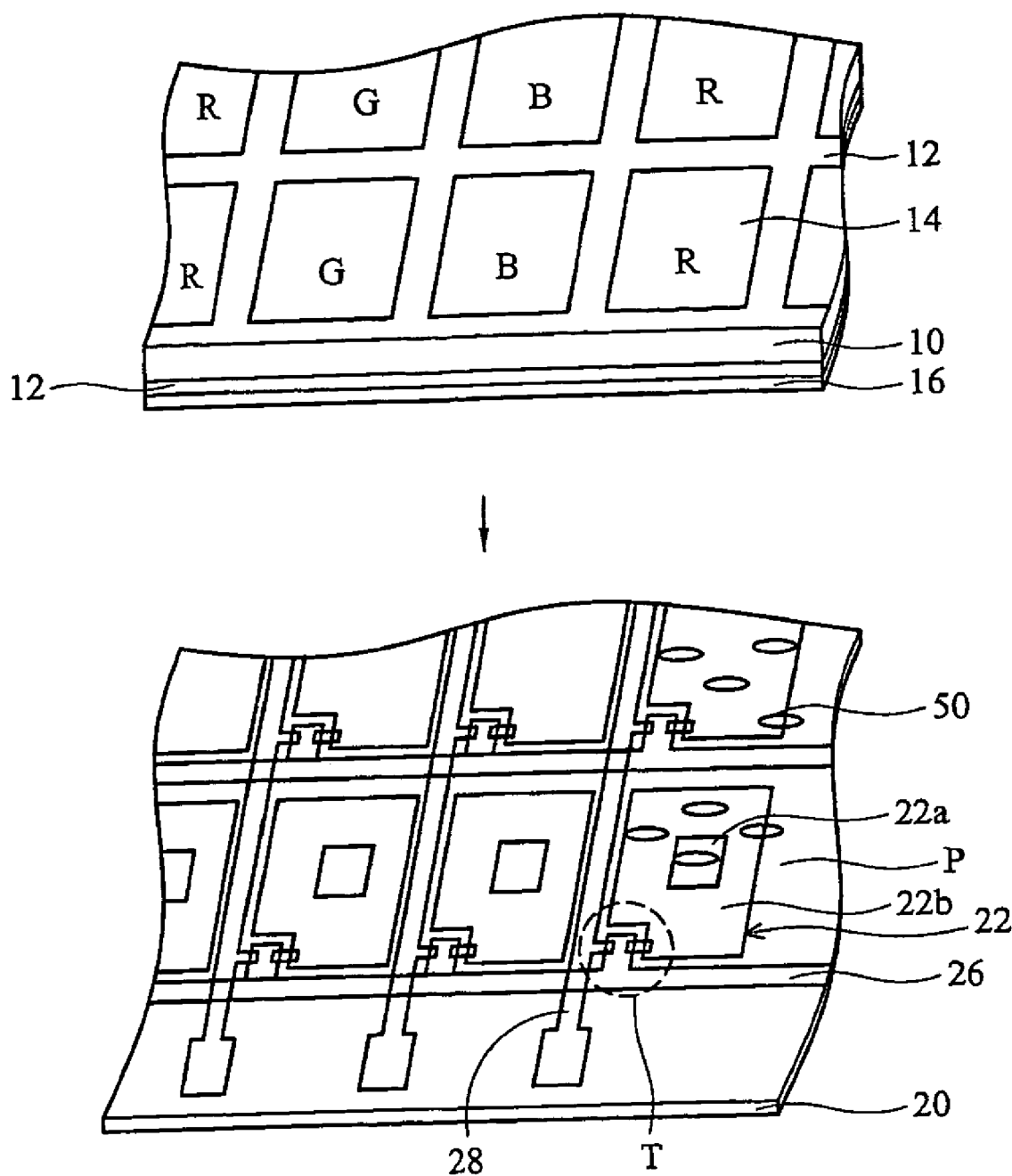
FIG. 1 shows an exploded perspective view of a conventional transflective LCD device.
Figure 2:
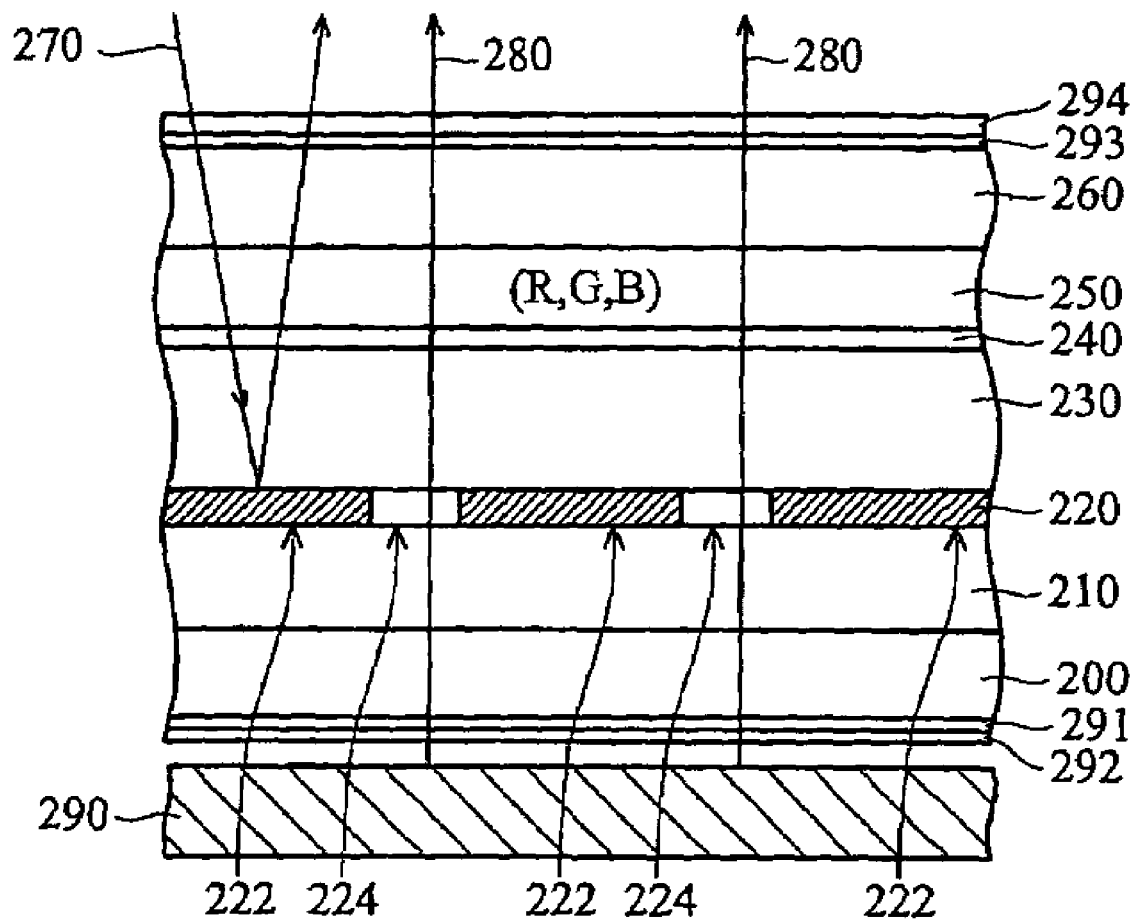
FIG. 2 shows a sectional view illustrating the operation of the conventional transflective LCD device.

Reference will now be made in detail to embodiments of the invention, examples of which are illustrated in the accompanying drawings. Wherever possible, the same reference numbers are used in the drawings and the description to refer to the same or like elements.

U.S. Patent Application Publication No. 2002/0041351 to Baek, U.S. Pat. No. 6,417,899 to Jones et al., and U.S. Patent Application Publication No. 2004/0085496 to Michael et al., disclose LCD devices and are each hereby incorporated by reference in their entirety.

Figure 3A:
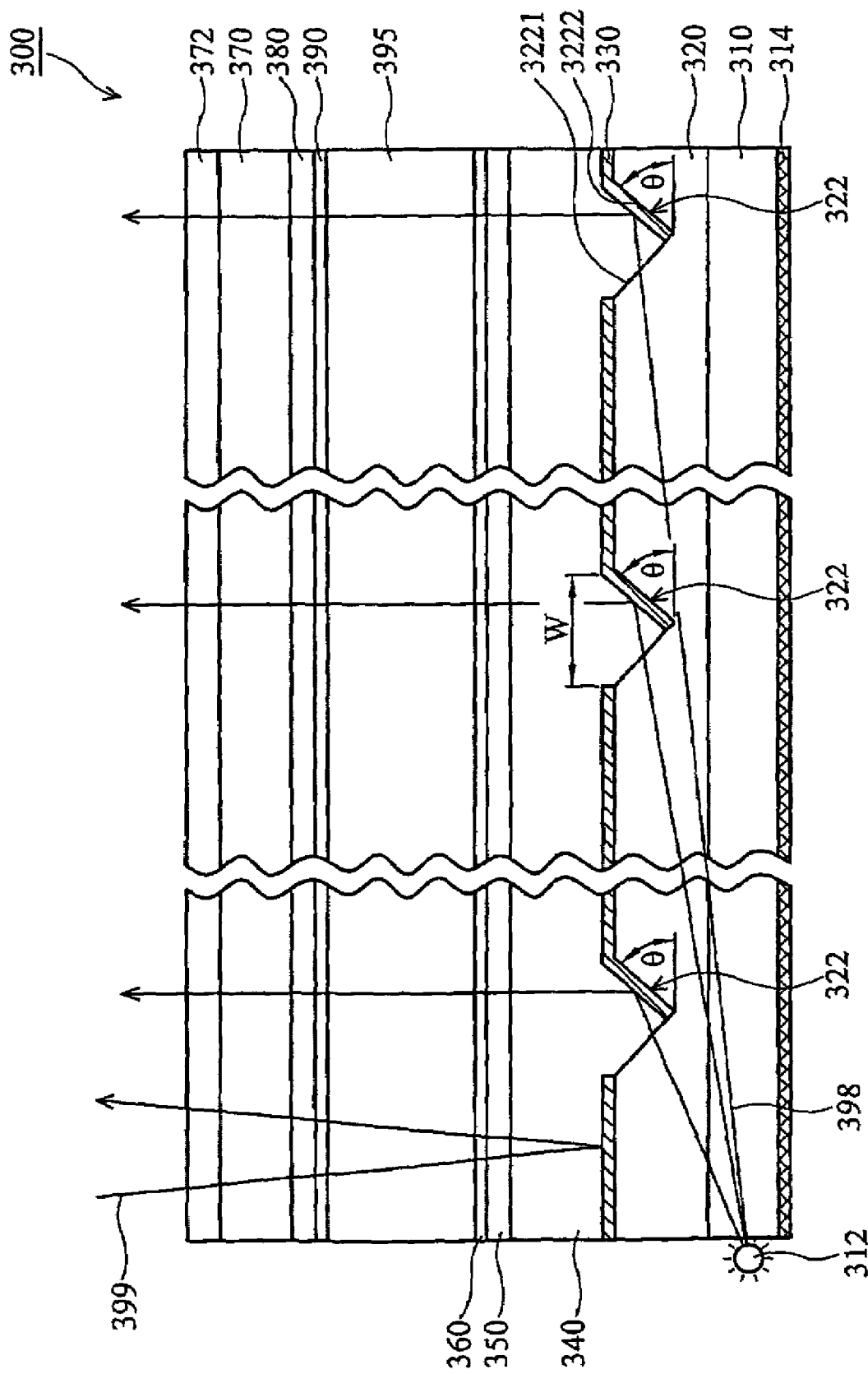
FIG. 3A shows a sectional view of a transflective LCD device according to embodiments of the invention.

FIG. 3A shows a transflective LCD device 300 according to an embodiment of the invention. As shown, LCD device 300 may comprise a first substrate 310, a light emitting device 312, a first reflective layer 314, an insulating layer 320, a second reflective layer 330, an overcoat layer 340, an internal polarizer 350, a first alignment layer 360, a second substrate 370, a common electrode 380, and a liquid crystal layer 395. These portions of LCD device 300 will now be further described.

First substrate 310 can serve as a lower substrate for LCD device 300. In some embodiments, first substrate 310 can be a glass substrate including an array of pixel driving elements (not shown), such as an array of thin film transistors (TFTs). Alternatively, first substrate 310 can be a plastic substrate with various levels of transmittance characteristics.

A light emitting device 312 can be disposed at the edge of the first substrate 310. Light emitting device 312 can comprise at least one light emitting diode (LED) or cold cathode fluorescent lamp (CCFL).

To enhance the light efficiency of light emitting device 312, first reflective layer 314 can be adhered to, or coated on the exterior of first substrate 310. First reflective layer 314 can comprise various reflective materials, such as aluminum or silver.

Insulating layer 320 can also be formed over first substrate 310. As shown, insulating layer 320 may comprise a plurality of notches 322. Each notch 322 comprises a first angled sidewall 3221 and a second angled sidewall 3222. In some embodiments, the width of the bottom of the notch 322 is narrower than that of the top of the notch 322. Insulating layer 320 can be $SiO_2$, SiN, SiON, or a photosensitive resin. Insulating layer 320 can be formed by deposition or coating. Notches 322 can then be formed in insulating layer 320 by photolithography. In some embodiments, the top width "w" of notch 322 may exceed approximately 2 µm and the vertical depth of notch 322 may be between approximately 2 µm and 5 µm. Additionally, the top surface of insulating layer 320 can be smooth or uneven.

In the example shown in FIG. 3A, second angled sidewall 3222 faces towards light emitting device 312, and thus, may be configured with an included angle θ from horizontal. The included angle θ may be between 90° and 45°. In the example shown, the included angles θ of all notches 322 are the same, such as, 45°. The representative V-shaped notches 322 shown in FIG. 3A are not intended to limit the invention, but merely illustrate one example of embodiments of the invention.

Second reflective layer 330 overlies the top surface of insulating layer 320 and may extend onto the second angled sidewall 3222. Second reflective layer 330 can be aluminum or silver and may be formed by sputtering and patterning. The surface of second reflective layer 330 can be smooth or uneven. As shown, a portion of second reflective layer 330 is on second angled sidewall 3222 and faces towards light emitting device 312. In addition, second reflective layer 330 can also serve as a pixel electrode that is electrically connected to TFTs (not shown) by plugs (not shown) penetrating insulating layer 320. The plugs can be simultaneously formed during formation of notches 322.

Overcoat layer 340 can be formed as an overlay on insulating layer 320 and reflective layer 330 to create a smooth surface. Overcoat layer 340 can be a photosensitive resin or spin on glass (SOG) that is formed by coating. In some embodiments, the thickness of overcoat layer 340 can be about 3 µm.

Internal polarizer 350 may also be disposed on overcoat layer 340. For example, internal polarizer 350 can be a thin crystal film (TCF) polarizer. Internal polarizer 350 can be made of at least partially crystalline film formed by rodlike supramolecules. The axes of the rodlike supramolecules may be aligned along the transmission axis of internal polarizer 350. The rodlike supramolecules may comprise at least one disc-shaped polycyclic organic compound with conjugated n-systems, wherein the disc-shaped polycyclic organic compound contains heterocycles. Internal polarizer 350 can also be formed from a lyotropic liquid crystal. Internal polarizer 350 can have an interplanar distance of approximately 3.4±0.3 Å along the transmission axis. First alignment layer 360 then overlies internal polarizer 350.

A second substrate 370 can serve as an upper substrate for LCD device 300. Second substrate 370 may be a glass substrate comprising a color filter. An external polarizer 372 may also be fixed to the exterior of second substrate 370.

Common electrode 380 can be disposed on the interior of second substrate 370. Common electrode 380 can be ITO or IZO and may be formed by deposition. A second alignment layer 390 may then overlay common electrode 380.

Liquid crystal molecules may fill the space between first substrate 310 and second substrate 370 to form liquid crystal layer 395. The orientation of liquid crystal layer 395 may be controlled by an electric field between pixel electrode 330 and common electrode 380.

During operation, in transmissive mode, at least some of light 398 from light emitting device 312 is reflected from second reflective layer 330 that is on second angled sidewall 3222 and passes through liquid crystal layer 395. In reflective mode, at least some of reflective light 399 from ambient light or an exterior light source (not shown) may pass through liquid crystal layer 395 and may also be reflected by second reflective layer 330. In some embodiments, the reflections from reflective layer 330 in either mode allows light emitting device 312 to be smaller or thinner than a conventional backlight. In addition, light emitting device 312 may be configured to consume less power. In turn, this allows LCD device 300 to have a thinner structure and consume less power, if desired.

Figure 3B:
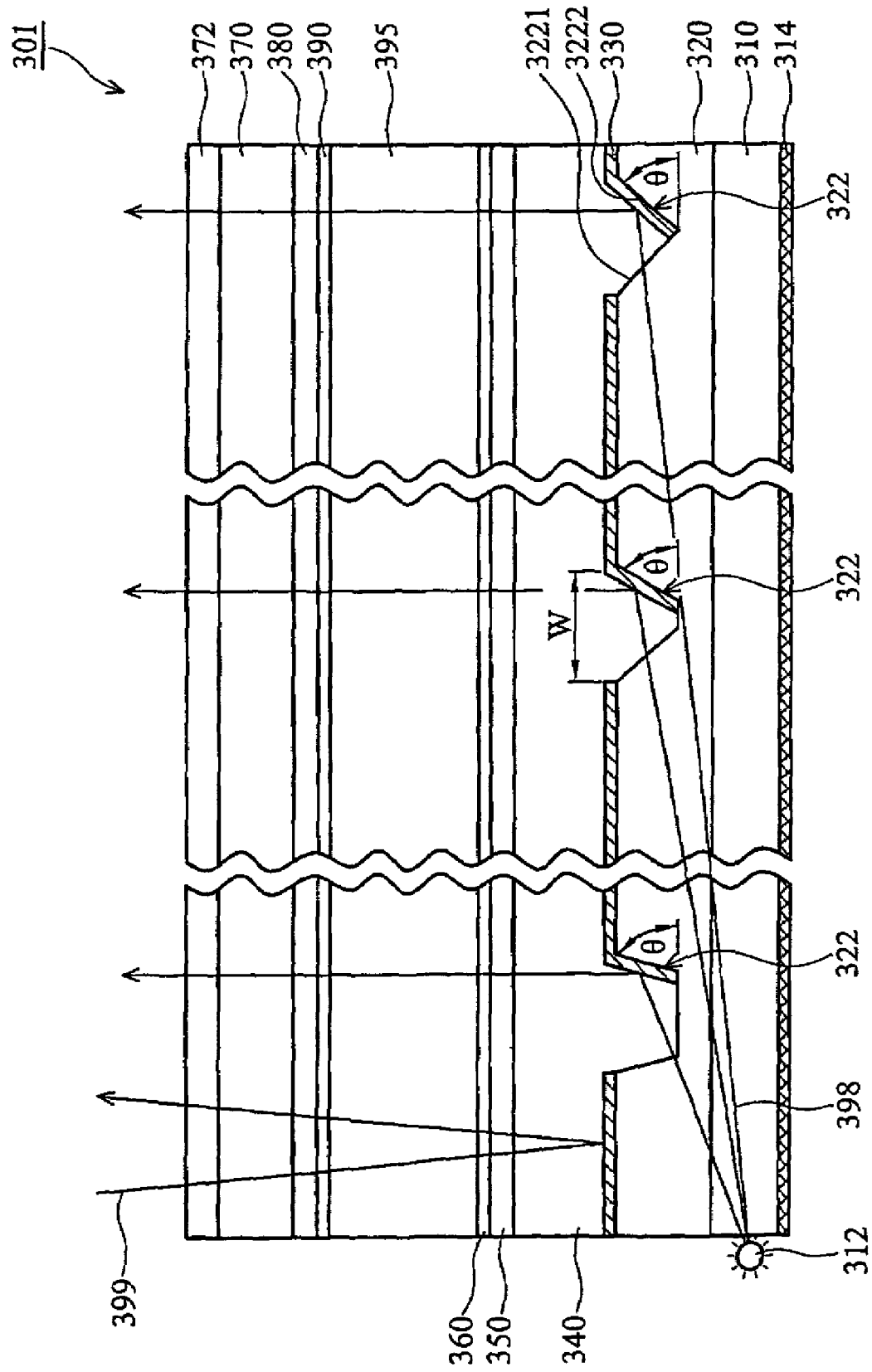
FIG. 3B shows a sectional view of another transflective LCD device according to embodiments of the invention.

FIG. 3B is a sectional view of a transflective LCD device 301 according to embodiments of the invention. Here, for those notches 322 that are farther away from light emitting device 312, the included angle θ may be decreased. For example, the included angle θ can begin at about 90° for those notches 322 that are near light emitting device 312 and decrease to about 45° for those notches 322 that are farther away from light emitting device 312.

In this embodiment, notches 322 can be formed by photolithography using an attenuated photomask or a slit photomask with different spacings. The top width "w" of the notch 322 may exceed approximately 2 μm and the vertical depth of each notch 322 may be between approximately 2 μm and 5 μm.

Figure 4A:
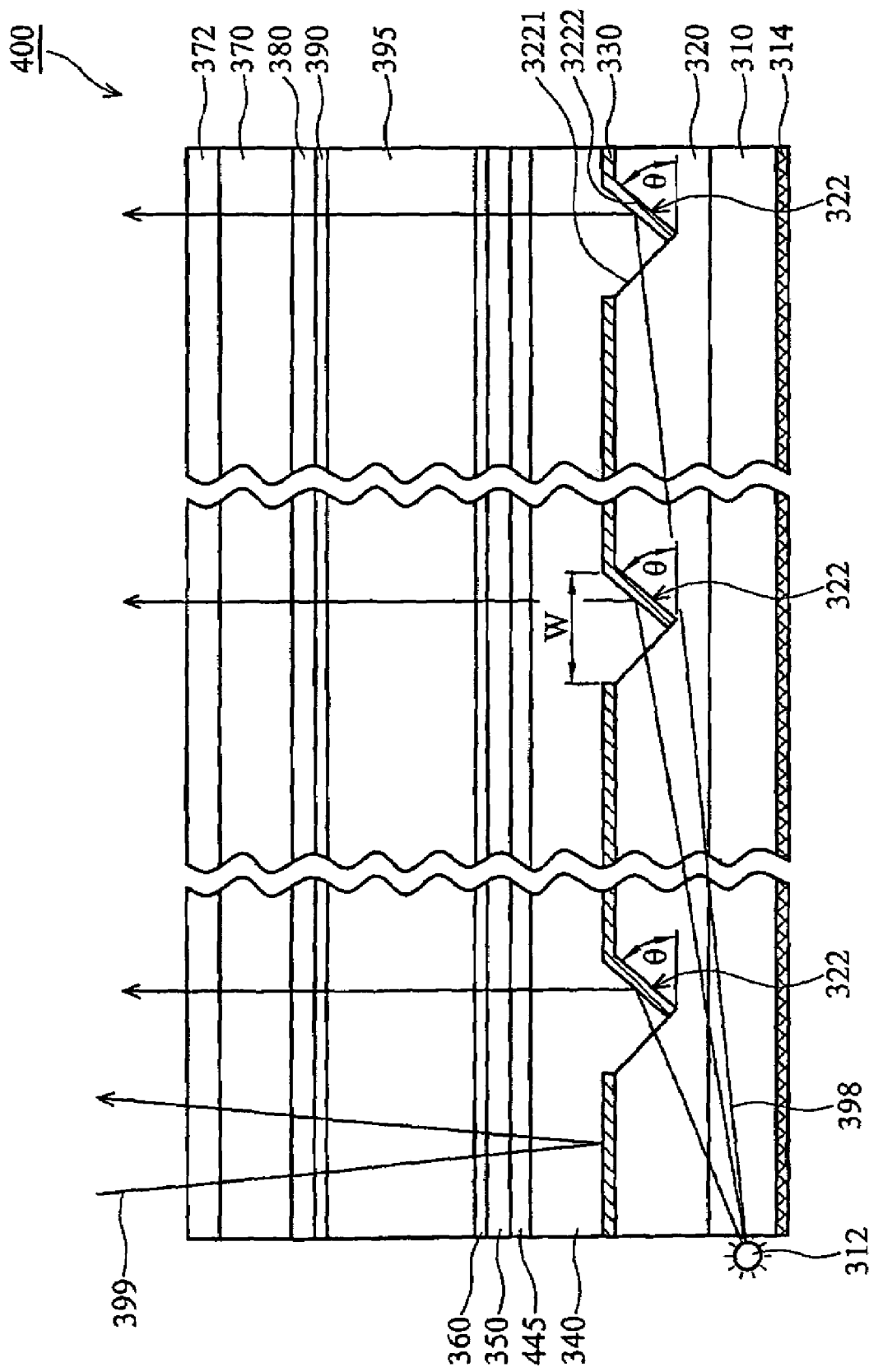
FIG. 4A shows a sectional view of another transflective LCD device according to embodiments of the invention.

FIG. 4A shows a transflective LCD device 400 that is consistent with embodiments of the invention. As shown in this example, LCD device 400 comprises a transparent electrode 445 that serves as a pixel electrode. Transparent electrode 445 may be interposed between overcoat layer 340 and internal polarizer 350. In this example, second reflective layer 330 serves as a reflector.

Transparent electrode 445 electrically connects the TFTs (not shown) by plugs (not shown) penetrating insulating layer 320 and overcoat layer 340. Transparent electrode 445 can be an ITO or IZO layer that is formed by deposition. In the example shown in FIG. 4A, the included angles θ of all notches 322 are the same. The included angle θ can be between 90° and 45°.

Figure 4B:
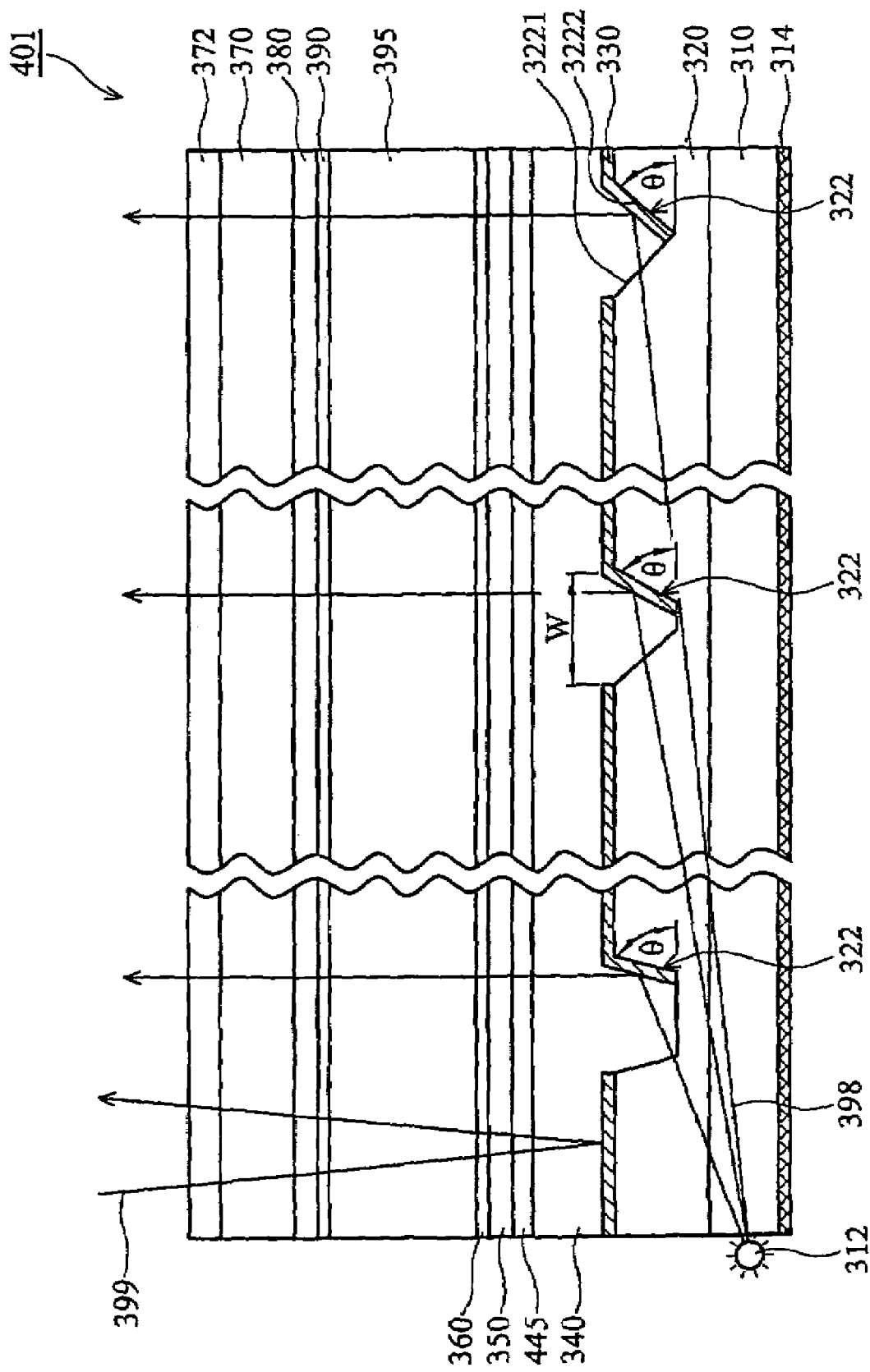
FIG. 4B shows a sectional view of another transflective LCD device according to embodiments of the invention.

FIG. 4B shows a sectional view of a transflective LCD device 401 according to embodiments of the invention. In this example, the included angle θ decreases for those notches 322 that are farther away from light emitting device 312. For example, the included angle θ may begin at about 90° and end at about 45°.

Figure 5A:
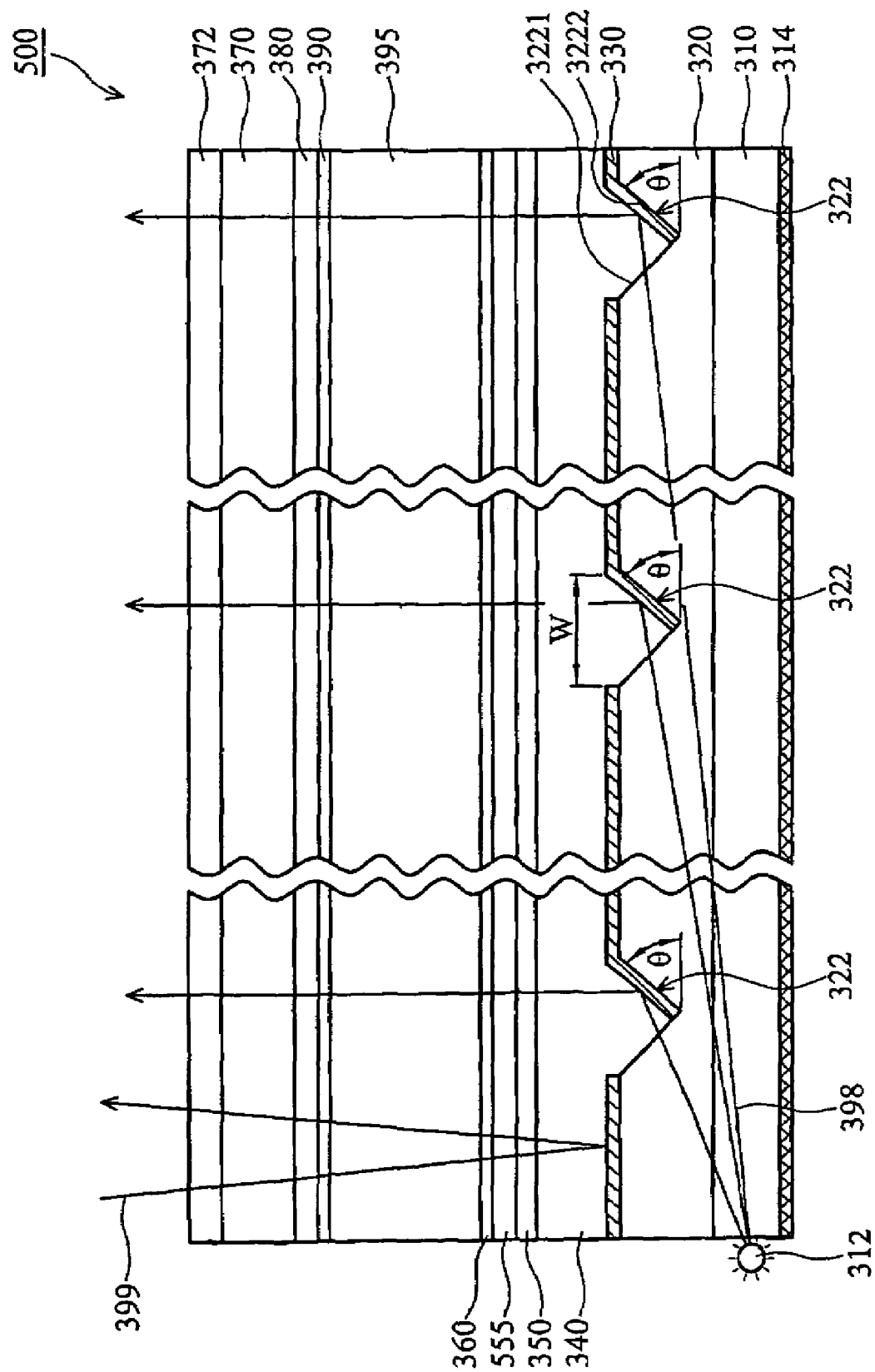
FIG. 5A shows a sectional view of yet another transflective LCD device according to embodiments of the invention.

FIG. 5A shows a transflective LCD device 500 that is consistent with embodiments of the invention. As shown, in this example, transflective LCD device 500 comprises a transparent electrode 555 that serves as a pixel electrode overlying internal polarizer 350. In this case, second reflective layer 330 can serve as a reflector.

Transparent electrode 555 is electrically connected to the TFTs (not shown) on first substrate 310. Here, the included angles θ of all notches 322 are the same. The included angle θ can be any angle between 90° and 45°.

Figure 5B:
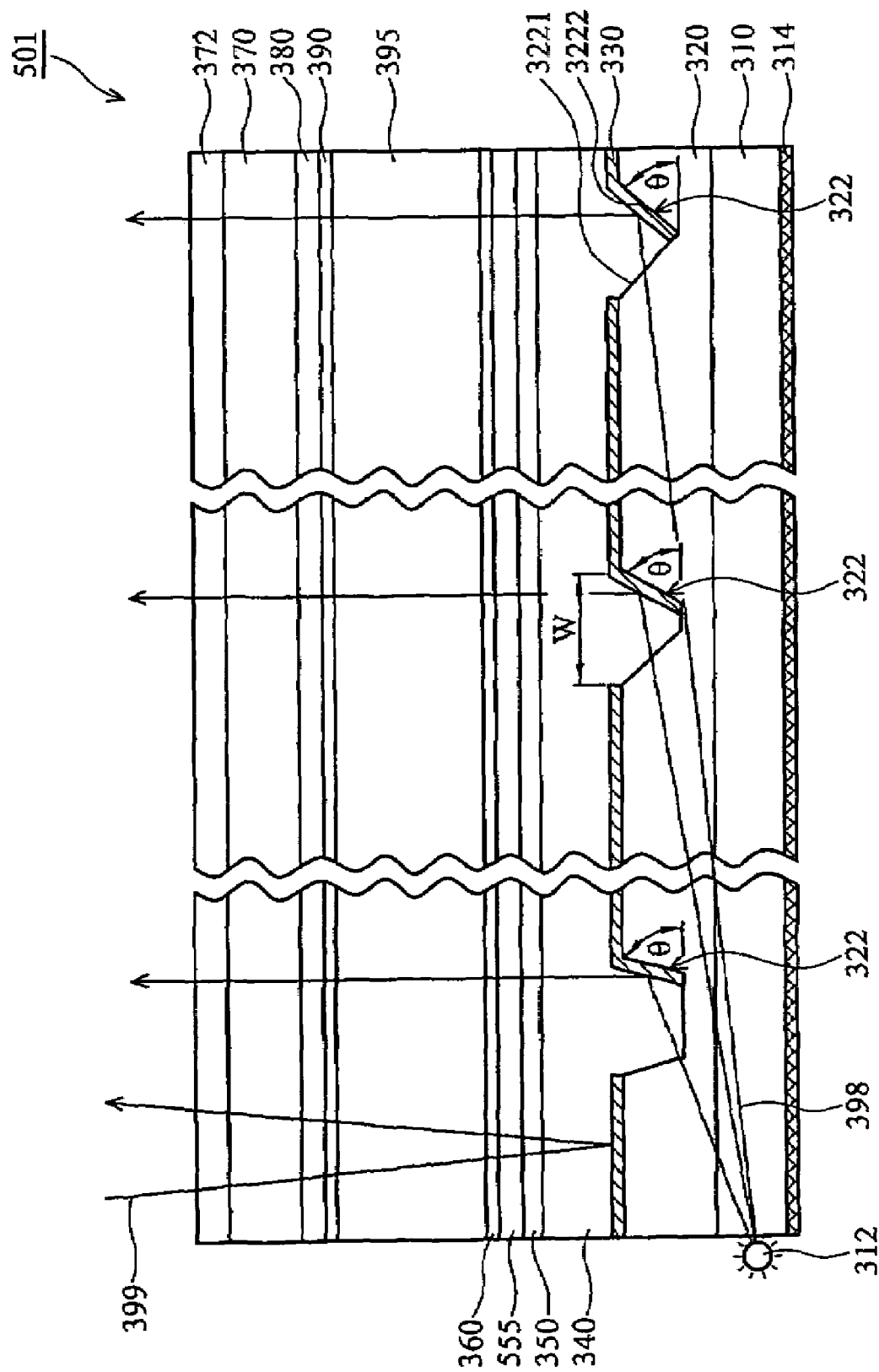
FIG. 5B shows a sectional view of another transflective LCD device according to embodiments of the invention.

FIG. 5B shows a sectional view of a transflective LCD device 501 according to embodiments of the invention. In this example, the included angle θ decreases respectively for those notches 322 that are farther away from light emitting device 312. For example, the included angle θ may begin at about 90° and may end at about 45°.

Figure 6:
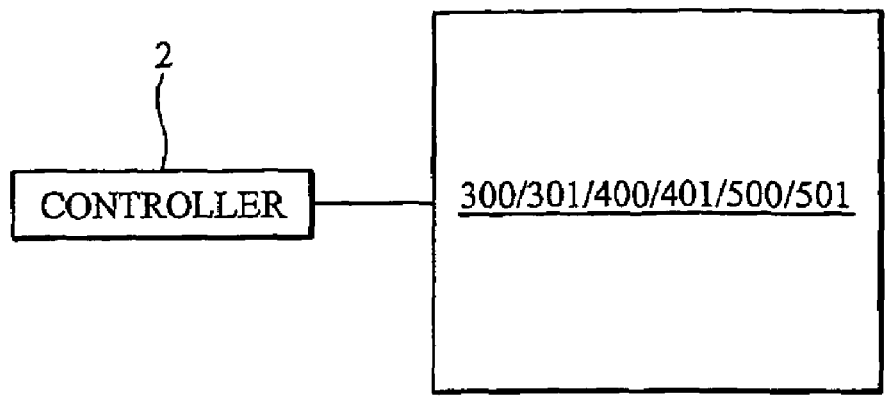
FIG. 6 shows a schematic diagram illustrating a transflective LCD apparatus according to embodiments of the invention.

FIG. 6 shows a controller 2 and a display device 3 that is coupled to an LCD that is consistent with embodiments of the invention. The LCD may be any of transflective LCD devices 300, 301, 400, 401, 500 and 501 respectively shown in FIGS. 3A, 3B, 4A, 4B, 5A an 5B. Controller 2 can comprise source and gate driving circuits (not shown) to control its LCD, e.g., any of transflective LCD devices 300, 301, 400, 401, 500 or 501, and render image in accordance with an input. Display device 3 and associated controller 2 may be configured as any known display device, such as a flat panel display.

Figure 7:
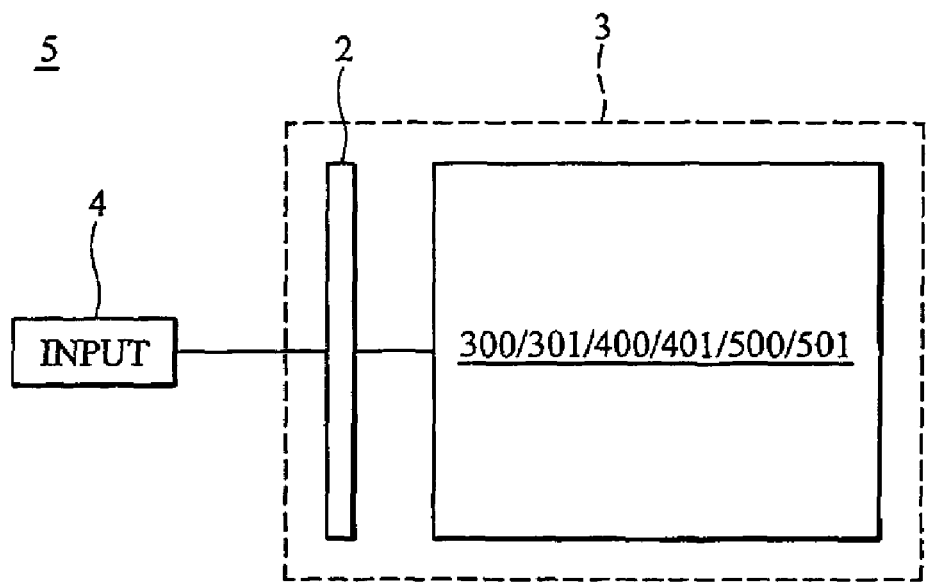
FIG. 7 shows a schematic diagram illustrating an electronic device incorporating a transflective LCD device that is consistent with embodiments of the invention.

FIG. 7 shows a schematic diagram illustrating an input device 4 that is coupled to an electronic device 5. Electronic device 5 may incorporate a transflective LCD device that is consistent with embodiments of the invention. As shown, input device 4 is coupled to controller 2 of display device 3 to form an electronic device 5. Input device 4 can include a processor or the like, inputting data to controller 2 to render an image. Electronic device 5 may be a portable device such as a personal digital assistant (PDA), notebook computer, tablet computer, cellular phone, a monitor, or desktop computer.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transflective liquid crystal display device, comprising:
    a first substrate;
    a second substrate;
    a liquid crystal layer interposed between the first substrate and the second substrate;
    a light emitting device disposed at an edge of the first substrate;
    an insulating layer formed on the first substrate and comprising a plurality of notches, each notch comprising a first sidewall and a second sidewall configured with an included angle from horizontal; and
    a second reflective layer formed on the insulating layer and extending onto the second sidewall, wherein the second reflective layer on the second sidewall faces toward the light emitting device;
    an internal polarizer formed overlying the second reflective layer; and
    a first reflective layer disposed on an exterior of the first substrate.

2. The transflective LCD device according to claim 1, further comprising:
    an overcoat layer between the second reflective layer and the internal polarizer; and
    a first alignment layer formed on the internal polarizer.

3. The transflective LCD device according to claim 1, further comprising:
    a second polarizer disposed on an exterior of the second substrate;
    a common electrode formed on an interior of the second substrate; and
    a second alignment layer formed on the common electrode.

4. The transflective LCD device according to claim 3, further comprising a transparent electrode formed overlying the overcoat layer or the first polarizer.

5. The transflective LCD device according to claim 1, wherein the light emitting device comprises at least one light emitting diode or cold cathode fluorescent lamp.

6. The transflective LCD device according to claim 1, wherein the second reflective layer comprises at least one of an aluminum or a silver layer.

7. The transflective LCD device according to claim 1, wherein the first reflective layer comprises at least one of an aluminum or a silver layer.

8. The transflective LCD device according to claim 1, wherein the included angle is between 90° and 45°.

9. The transflective LCD device according to claim 1, wherein the included angle decreases as the notch moves away from the light emitting device.

10. A method of fabricating a transflective liquid crystal device, comprising:
    providing a first substrate and a second substrate;

forming an insulating layer on the first substrate and comprising a plurality of notches, wherein each notch comprises a first sidewall and a second sidewall having an included angle from horizontal;

interposing a liquid crystal layer between the first substrate and the second substrate;

disposing a light emitting device at an edge of the first substrate;

forming a second reflective layer on the insulating layer and extending onto the second sidewall, wherein the second reflective layer on the second sidewall faces the light emitting device;

forming an internal polarizer over the second reflective layer; and forming a first reflective layer on an exterior of the first substrate.

11. The method according to claim 10, further comprising:

forming an overcoat layer between the second reflective layer and the internal polarizer; and forming a first alignment layer overlying the internal polarizer.

12. The method according to claim 11, further comprising forming a transparent electrode overlying the overcoat layer or the internal polarizer.

13. The method according to claim 10, further comprising:

disposing a second polarizer on an exterior of the second substrate;

forming a common electrode on an interior of the second substrate; and forming a second alignment layer on the common electrode.

14. The method according to claim 10, wherein the light emitting device comprises at least one light emitting diode or cold cathode fluorescent lamp.

15. The method according to claim 10, wherein each of the first reflective layer and the second reflective layer comprises at least one of an aluminum or a silver layer.

16. The method according to claim 10, wherein the included angle is between 90° and 45°.

17. The method according to claim 10, wherein the included angle decreases as the notch moves away from the light emitting device.

18. An electronic device, comprising:

a transflective LCD device comprising a first substrate, a second substrate, a liquid crystal layer interposed between the first substrate and the second substrate, a light emitting device disposed at an edge of the first substrate, an insulating layer formed on the first substrate and comprising a plurality of notches, each notch comprising a first angled sidewall and a second angled sidewall configured with an included angle from horizontal, a second reflective layer formed on the insulating layer and extending onto the second angled sidewall, wherein the second reflective layer on the second angled sidewall faces toward the light emitting device, an internal polarizer formed over the second reflective layer, and a first reflective layer disposed on an exterior of the first substrate;

a controller coupled to the transflective LCD device; and an input device coupled to the controller to input data to the controller to render an image.

* * * * *